United States Patent
Su et al.

(10) Patent No.: US 7,489,458 B2
(45) Date of Patent: Feb. 10, 2009

(54) PIEZOELECTRICITY-DRIVING OPTICAL LENS MODULE

(75) Inventors: Han-Wei Su, Hsinchu (TW); Chao-Chang Hu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/802,707

(22) Filed: May 24, 2007

(65) Prior Publication Data

US 2008/0137214 A1    Jun. 12, 2008

(30) Foreign Application Priority Data

Dec. 7, 2006    (TW)    ............................... 95145572 A

(51) Int. Cl.
*G02B 7/02* (2006.01)
*G03B 3/10* (2006.01)

(52) U.S. Cl. ..................... 359/824; 359/822; 359/694; 359/696; 359/698; 396/133; 348/335

(58) Field of Classification Search ......... 359/822–824, 359/694–698; 348/207.99, 208.7, 208.99, 348/222.1, 333.01, 335, 374, E5.026, E5.028, 348/E5.031; 396/79, 133; 74/473.12
See application file for complete search history.

(56) References Cited

U.S. PATENT DOCUMENTS

| | | | |
|---|---|---|---|
| 4,423,941 A * | 1/1984 | Iwata et al. ................ 396/133 |
| 5,225,941 A | 7/1993 | Saito et al. |
| 5,490,015 A * | 2/1996 | Umeyama et al. ........... 359/824 |
| 5,587,846 A * | 12/1996 | Miyano et al. .............. 359/824 |
| 5,859,733 A * | 1/1999 | Miyano et al. .............. 359/824 |
| 6,539,174 B1 * | 3/2003 | Tanii et al. .................... 396/55 |
| 6,710,950 B2 | 3/2004 | Rouvinen et al. |
| 6,717,331 B1 | 4/2004 | Lan et al. |
| 6,853,507 B2 * | 2/2005 | Ryu et al. ................... 359/824 |
| 6,961,193 B2 | 11/2005 | Kang et al. |
| 7,099,093 B2 | 8/2006 | Jeong et al. |
| 7,262,926 B2 * | 8/2007 | Ohsato ....................... 359/814 |
| 7,298,564 B2 * | 11/2007 | Rouvinen et al. ........... 359/824 |
| 2008/0085110 A1 * | 4/2008 | Su et al. ..................... 396/133 |
| 2008/0088946 A1 * | 4/2008 | Hu et al. .................... 359/696 |

FOREIGN PATENT DOCUMENTS

TW    58977    6/2004

* cited by examiner

*Primary Examiner*—Loha Ben
(74) *Attorney, Agent, or Firm*—Birch, Stewart, Kolasch & Birch, LLP

(57) ABSTRACT

A piezoelectric-driving optical lens module is disclosed, including a lens body a piezoelectric actuator for providing a driving force, and a position sensor for detecting position variations. The lens body includes at least a hollow base body, a lens barrel exhibiting axial freedom of movement positioned inside the hollow base body, and a lens set disposed inside the lens barrel. The lens barrel is driven by a piezoelectric actuator to move the lens set along the optical axis to achieve the optical functions of zooming and focusing. The position sensor is configured to detect the axial position of the lens barrel with respect to the hollow base body, thereby providing a simple structure to improve on the drawbacks of prior techniques.

31 Claims, 8 Drawing Sheets

PIEZOELECTRICITY-DRIVING OPTICAL LENS MODULE

This Nonprovisional application claims priority under 35 U.S.C. § 119(a) on Patent Application No(s). 095145572 filed in Taiwan, Republic of China on Dec. 7, 2006, the entire contents of which are hereby incorporated by reference.

FIELD OF THE INVENTION

The present invention relates to an optical lens module, and more particularly, to a piezoelectric-driving optical lens module.

DESCRIPTION OF THE RELATED ART

Recently, optical systems and actuator structures applied to a personal mobile communication device or digital camera have become more simplified and miniaturized to make the devices they reside in as small and thin as possible. The piezoelectric actuator has the advantages of small overall device volume, high driving force, low power consumption, low audible-noise, and high compatibility in application to digital cameras or personal mobile phones with cameras in order to drive the optical lens for the optical system or related products to achieve the optical functions of zooming and focusing.

A multiple-thin-plate piezoelectric-driving super sonic motor is disclosed in TW. Pat. No. 589777. In the disclosure, a high voltage with alternating current is applied to a transducer comprised of piezoelectric material to produce alternating expansion and contraction for making an elastic vibrating plate produce a traveling-wave and a standing wave as the output kinetic energy, wherein a driving module is constructed in a symmetrically vertical or parallel way. Although the disclosed patent can reduce the wear on the components, the structure of the motor is complicated due to the multiple driving modules utilized in the design, making the design hard to be miniaturized, thus restricting the scope of application.

A compact lens module is disclosed in U.S. Pat. No. 7,099,093. As shown in the FIG. 1, a piezoelectric actuator 100 causes contact wheel 101 to rotate carrying member 102, and furthermore, making the lens 103 move forwardly or backwardly. In the torque theory, M equals r×F (where M is the moment in newton-meters, r is the distance from the point of contact of the force to the pivot point, and F is the force in newtons), and, although a miniaturized contact wheel 101 with a small value for r would reduce the whole volume of the device, the piezoelectric actuator 100 would need to increase the force, thus consuming more power. And as the contact wheel 101 is enlarged, the whole volume is oppositely increased.

A driving device is disclosed in U.S. Pat. No. 5,225,941. As shown in FIG. 2, the piezoelectric actuator 104 is the source of force, and the leaf spring 105 produces pre-stress. While the driving signal is input, the piezoelectric actuator 104 and the leaf spring 105 can cause the lens 106 move forwardly or backwardly. However, the structure of piezoelectric actuator 104 should be composed of multi-layer piezoelectric pieces to have a sufficient movement and force. Thus, to miniaturize the piezoelectric actuator 104 is difficult.

A piezoelectric actuator for a digital camera optical system is disclosed in U.S. Pat. No. 6,710,950. As shown in FIG. 3, the piezoelectric actuator system includes a lens tube 107 inside a support tube 108, in which the support tube 108 is combined with a piezoelectric actuator 109, wherein the piezoelectric actuator 109 includes multiple bimorph piezoelectric elements 111 arranged equidistantly on the inner surface of the flexible printed circuit board 110. The bimorph piezoelectric elements 111 and their associated engagement pads 112 are connected. A voltage is applied to the bimorph piezoelectric elements 111 arranged about the outer cylindrical surface of the lens tube 107 to produce surface waves to cause the associated engagement pads 112 to engage the lens tube 107 and adjust its axial position opposite to the support tube 108 for achieving the optical functions of zooming and focusing. However, when multiple bimorph piezoelectric elements 111 are used in the design, the production costs and assembly difficulty increases, and it is hard to control the precision of the axial movement of the lens tube 107. Moreover, the length of the support tube 108 is related to the axial movement of the lens tube 107, and as the total axial travel range of the lens tubes 107 is increased in the design, the length of the support tube 108 must also be increased, thus making it hard to miniaturize this kind of piezoelectric actuator system.

A driving device is disclosed in U.S. Pat. No. 6,961,193. As shown in FIG. 4, the driving means 113 can apply its own transport force to the lens 114 to make the lens 114 move forwardly or backwardly. A weight 115 is attached to the outer periphery of the driving means 113 to facilitate transfer of the transport force from the driving means 113 to the lens 114. However, due to the mass of the weight 115, the outer diameter and the weight of the driving device cannot be miniaturized.

According to the above drawbacks of the prior art, a piezoelectric-driving optical lens module to accomplish the functions of high driving torque, small device volume, simplified components, solid structure, easy manufacture, and quick assembly for solving the disadvantages is quite desirable.

SUMMARY OF THE INVENTION

Accordingly, the present invention has been devised to solve the aforementioned problems, and an objective of the present invention is to provide a piezoelectric-driving optical lens module with a simplified structure.

Another objective of the invention is to provide a piezoelectric-driving optical lens module with miniaturized volume.

Another objective of the invention is to provide a piezoelectric-driving optical lens module with high driving torque.

Another objective of the invention is to provide a piezoelectric-driving optical lens module with a solid structure.

Another objective of the invention is to provide a piezoelectric-driving optical lens module with ease of manufacture.

Another objective of the invention is to provide a piezoelectric-driving optical lens module with ease of assembly.

In order to accomplish the above objectives, the present invention provides a piezoelectric-driving optical lens module including a lens body, a piezoelectric actuator for providing a driving force, and a position sensor for detecting position variations. The lens body includes at least a hollow base body with a through-opening, a lens barrel with axial freedom of movement along the optical axis of the through-opening positioned inside the hollow base body, and a lens set moving with respect to the axis of the through-opening disposed inside the lens barrel. The piezoelectric actuator is positioned between the hollow base body and the lens barrel. The lens barrel is driven by a piezoelectric actuator to move the lens set along the optical axis to achieve the optical functions of zooming and focusing. The position sensor positioned inside the hollow base body is configured to detect the axial position of the lens barrel with respect to the hollow base body.

In the said piezoelectric-driving optical lens module, the lens body further comprises a cover body. The hollow base body has an opening located in the opposite side of the through-opening for installing the lens barrel, the lens set, and the piezoelectric actuator. And by closing the cover body, the lens barrel, the lens set, and the piezoelectric actuator are positioned. Moreover, the lens body further comprises a first guiding part parallel to the optical axis of the through-opening and positioned inside the hollow base body. A second guiding part corresponding to the first guiding part is positioned in the outer side of the lens barrel as to move the lens barrel inside the hollow base body along the optical axis of the through-opening. Preferably, the first guiding part includes guiding troughs along two inner sides of the hollow base body, and the second guiding part includes guiding troughs corresponding to the first guiding part along two sides of the lens barrel.

The lens body includes multiple lens barrels and corresponding lens sets, wherein a lens set can be an optical lens or multi-lenses. The position sensor can be chosen from optical sensor devices or electromagnetic sensor devices. In a preferred embodiment, the position sensor includes a position reacting component located at the outer side of the lens barrel, and a signal-receiving component located at the hollow base body for receiving signals. In another preferred embodiment, the position sensor includes a position reacting component located at the hollow base body, and a signal-receiving component located at the outer side of the lens barrel for receiving signals. The said position reacting component can be a reflecting bar-code, and the said signal-receiving component can be a sensor.

The lens body further includes a wear-resisting part located at the inner surface of the hollow base body. The piezoelectric actuator is located at the outer side of the lens barrel and in contact with the wear-resisting part. Preferably, the piezoelectric actuator includes a stator and a pre-stress device both fixed and in contact with each other at the outer side of the lens barrel. In addition, a C-shaped trough is located at the outer side of the lens barrel for tightening the stator. In a preferred embodiment, the pre-stress device includes an elastic component positioned between the stator and the outer side of the lens barrel, wherein the elastic component is, for example, a rubber pad. In another preferring embodiment, the pre-stress device includes an adjusting member correspondingly far from the wear-resisting part located at the side of the lens barrel, a roller located at the adjusting member to roll and contact with the inner surface of the hollow base body, and an elastic member to make the roller contact with the pre-stress device, wherein the elastic member can be, for example, a compressing spring or a torque spring.

Moreover, the lens body further includes a wear-resisting part located at the outer side of the lens barrel. The piezoelectric actuator is located at the inner surface of the hollow base body and contacted with the wear-resisting part. Preferably, the piezoelectric actuator includes a stator and a pre-stress device both fixed and contacted with each other at the inner side of the hollow base body. And, meanwhile, a C-shaped trough is located at the inner side of the hollow base body for keeping the stator tight. In a preferred embodiment, the pre-stress device includes an elastic component positioned between the stator and the inner surface of the hollow base body, wherein the elastic component is, for example, a rubber pad.

Furthermore, the lens body further includes a wear-resisting part located at the outer side of the lens barrel. The piezoelectric actuator includes a pre-stress device correspondingly far from the wear-resisting part located at the outer side of the lens barrel, and a stator located at the inner surface of the hollow base body and in contact with the wear-resisting part. Meanwhile, a C-shaped trough is located at the inner surface of the hollow base body for tightening the stator. In another preferred embodiment, the pre-stress device includes an adjusting member correspondingly far from the wear-resisting part located at a side of the lens barrel, a roller fixed at the adjusting member to roll and to contact with the inner surface of the hollow base body, and an elastic member to make the roller contact with the pre-stress device, wherein the elastic member can be, for example, a compressing spring or a torque spring.

The said wear-resisting part can be sliding tracks. Preferably, the material for the sliding track can be chosen from metal, oxide, and wear-resisting material. The stator includes a metal tube and two piezoelectric ceramic pieces. Preferably, the two piezoelectric ceramic pieces are separated with a distance fixed at the outer surface of the metal tube. The piezoelectric ceramic pieces can be single-layer or multi-layers. Meanwhile, the piezoelectric ceramic pieces can be polarized, electrode spreading, or cutting, according to the mold shape.

Compared with the prior art, the present invention utilizes the piezoelectric-driving actuator to accomplish the zooming action of the lens set to obtain the optimal image quality and desired framing via a design providing higher torque and smaller volume for mobile phones with digital cameras and other small and/or portable devices. Additionally, the main components of the present invention can use individual components or integrally formed components, so it is easy to be manufactured. Meanwhile, the components of the present invention have their own fixed or imbedded positions, so it is easy to be assembled.

DETAILED DESCRIPTION OF THE INVENTION

Hereinafter, preferred embodiments of the present invention will be described in detail with reference to the accompanying drawings.

The First Embodiment

Figure 1:
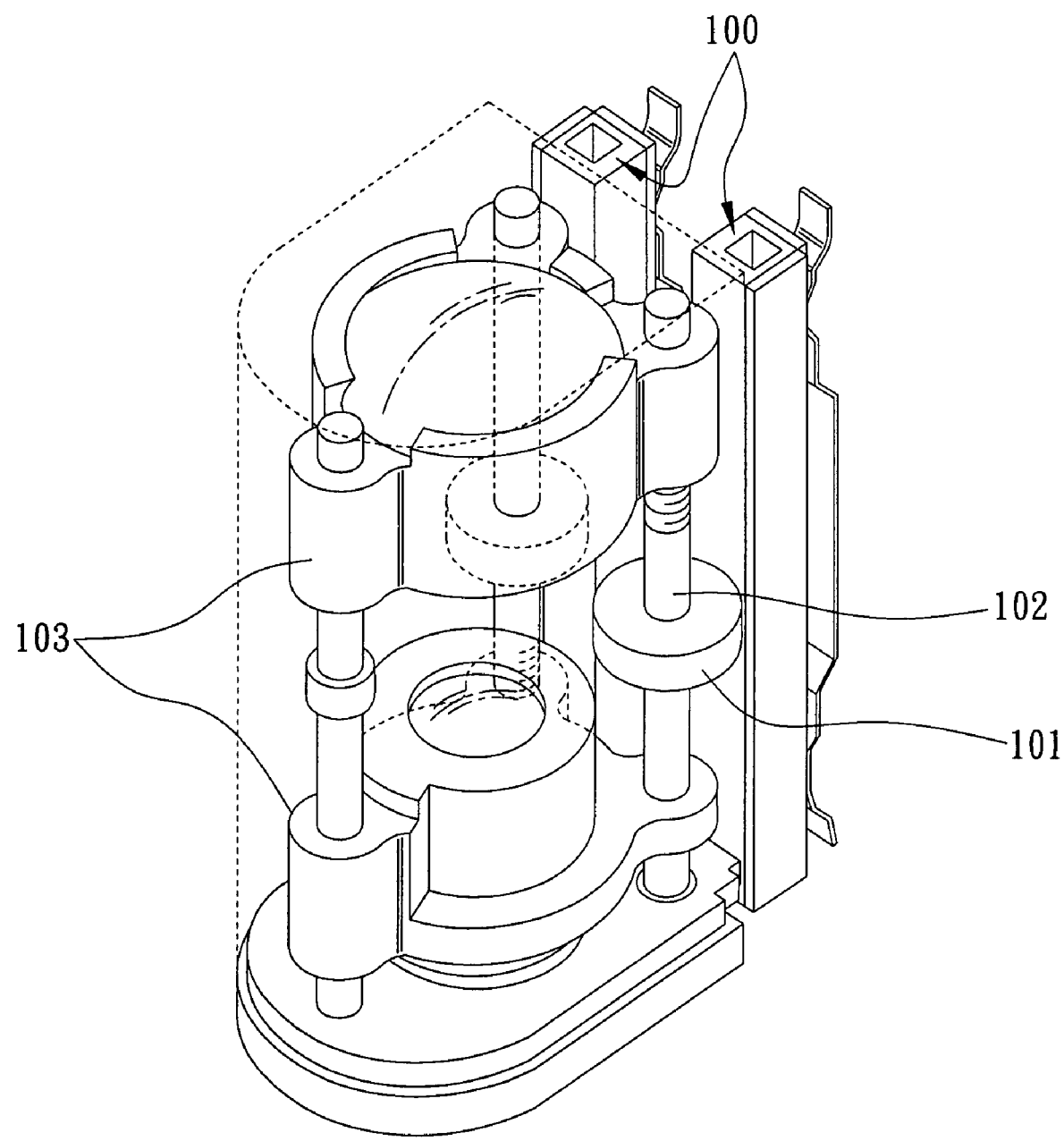
FIG. 1 is a perspective view showing the invention in U.S. Pat. No. 7,099,093.
Figure 2:
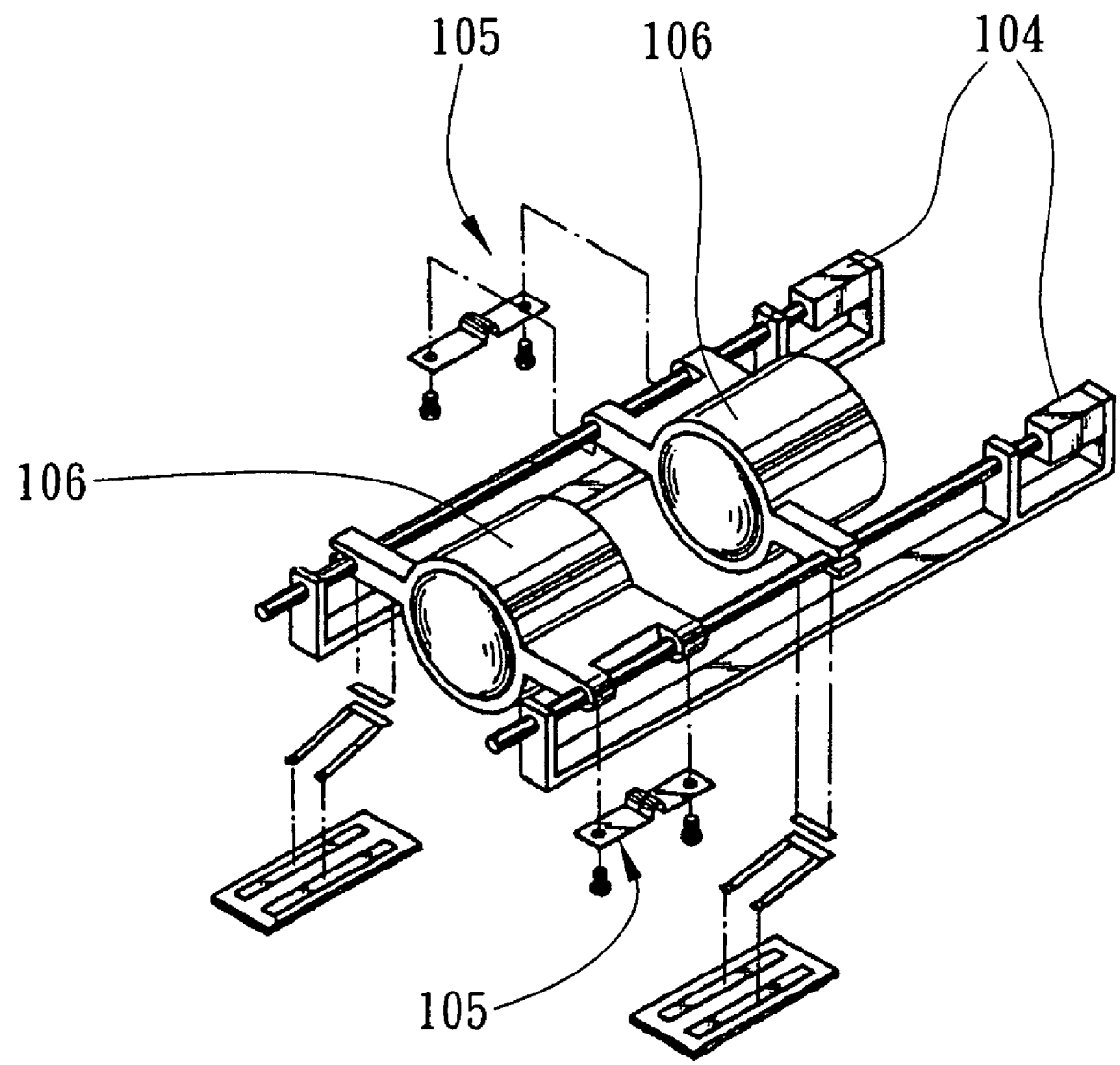
FIG. 2 is a perspective view showing the invention in U.S. Pat. No. 5,225,941.
Figure 3:
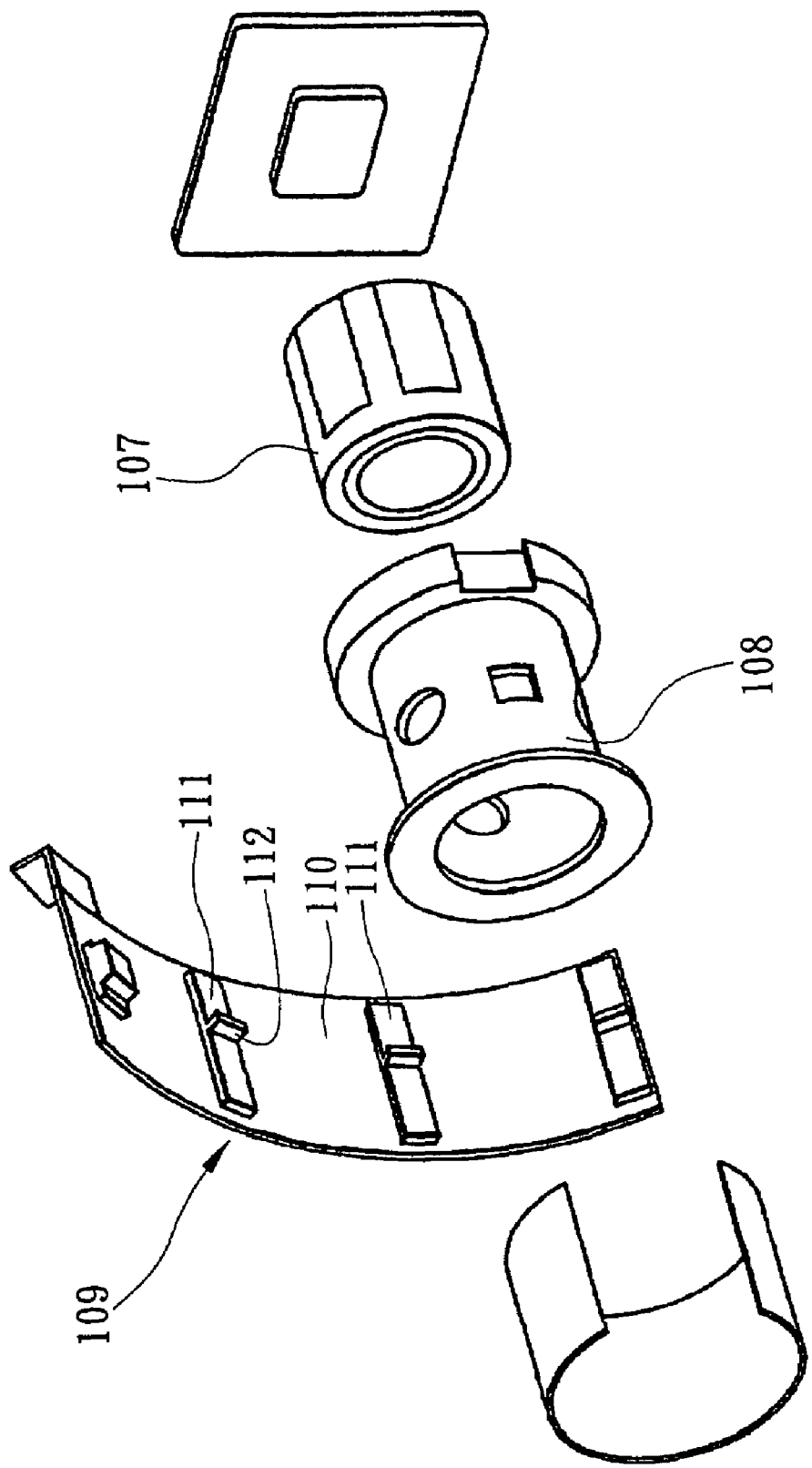
FIG. 3 is a perspective view showing the invention in U.S. Pat. No. 6,710,950.
Figure 4:
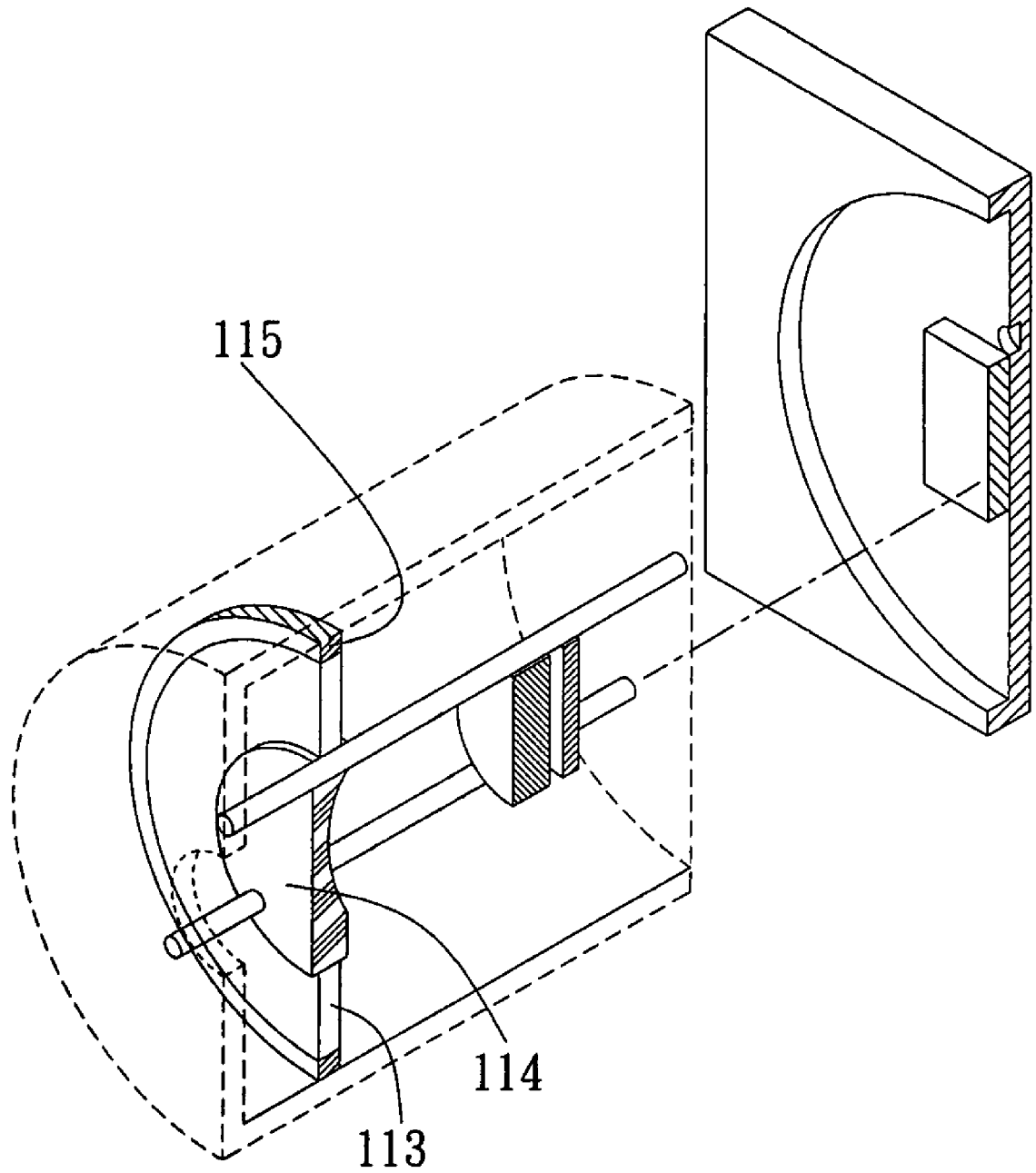
FIG. 4 is a perspective view showing the invention in U.S. Pat. No. 6,961,193.
Figure 5:
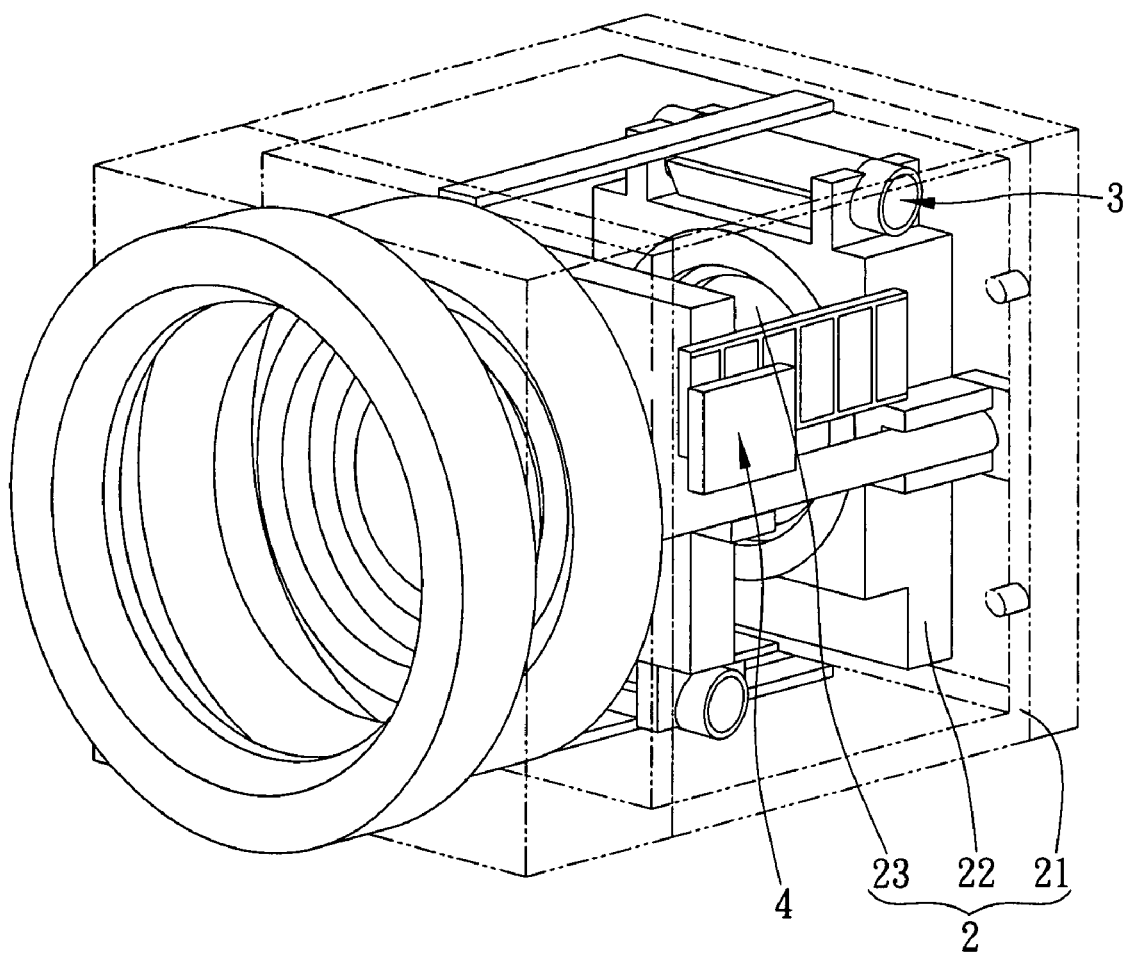
FIG. 5 is a perspective view showing the first embodiment according to the present invention.
Figure 6:
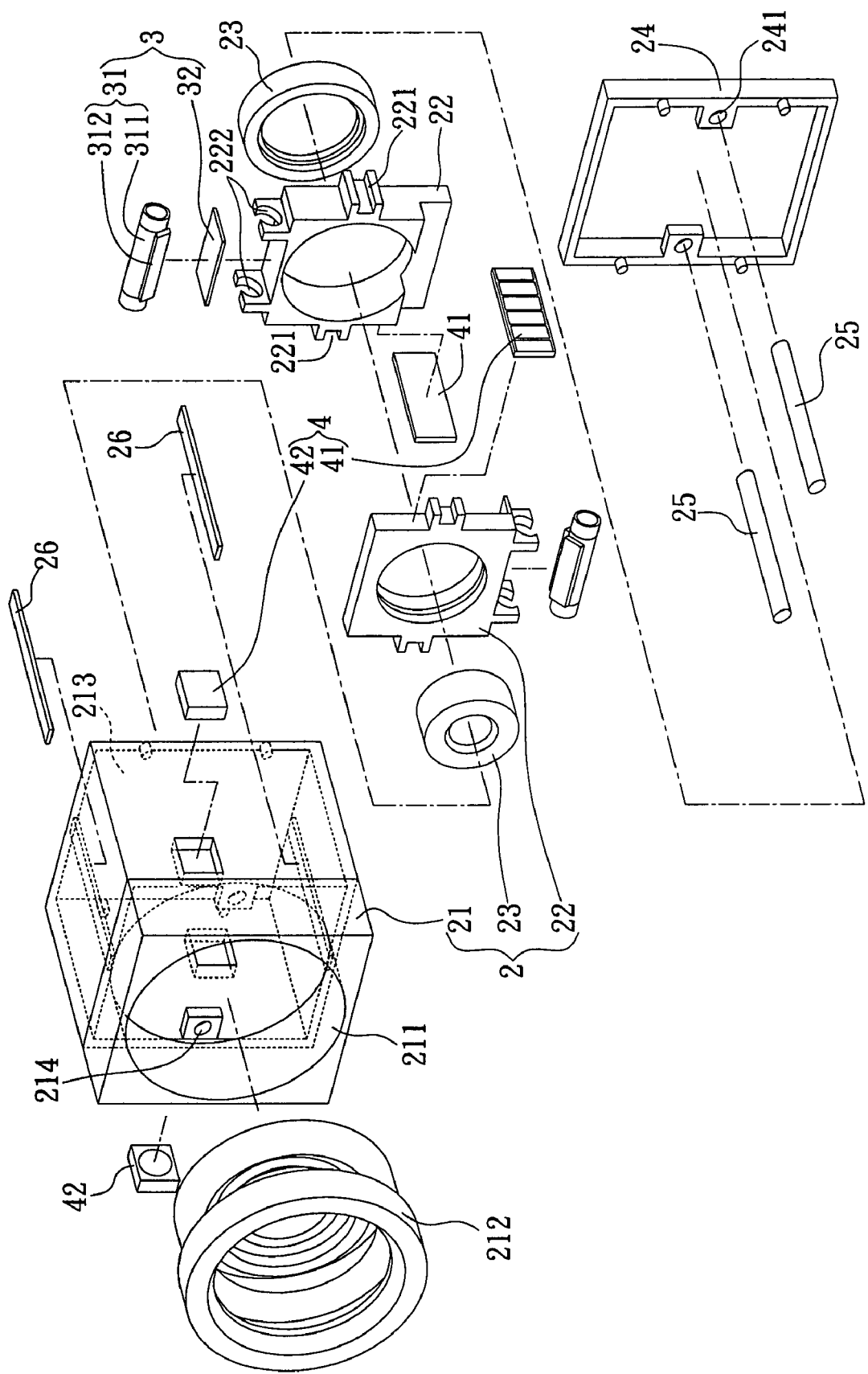
FIG. 6 is an exploded view showing the first embodiment according to the present invention.

As shown in FIG. 5 and FIG. 6, the present invention provides a piezoelectric-driving optical lens module including a lens body 2, a piezoelectric actuator 3 for providing a driving force, and a position sensor 4 for detecting position variations. The lens body 2 includes at least a hollow base body 21 with a through-opening 211, a lens barrel 22 with axial freedom of movement along the optical axis of the through-opening 211 positioned inside the hollow base body 21, and a lens set 23 moving with respect to the optical axis of the through-opening 211 disposed inside the lens barrel 22. The piezoelectric actuator 3 is positioned between the hollow base body 21 and the lens barrel 22. The lens barrel 22 is driven by a piezoelectric actuator 3 to move along the axis corresponding to the hollow base body 21 to achieve the optical functions as zooming and focusing. The position sensor 4 positioned inside the hollow base body 21 is configured to detect the axial position of the lens barrel 22 with respect to the hollow base body 21. The disadvantages of the prior art can be solved by utilizing the piezoelectric driving optical lens module with simplified structure.

In the above embodiment, the lens body 2 comprises two lens barrels 22 positioned inside the hollow base body 21, and two corresponding lens sets 23, and two sets of the piezoelectric actuators 3, and the position sensor 4. However, in other embodiments, depending on design requirements for the optical system, the design may employ a single lens set or multiple sets, the lens body can be composed of single or multiple lens barrels 22 and corresponding lens sets 23, thus the design is not restricted to the above embodiment wherein the lens set 23 can be an optical lens or multi-lenses as required. And the number of the lens sets employed is not a central point of disclosed technique of the present invention. In addition, the lens body 2, for example, may be chosen from the many types of lens bodies with zooming and focusing functions, includes at least a hollow base body 21 with a through-opening 211, a lens barrel 22 with axial freedom of movement along the optical axis of the through-opening 211 positioned inside the hollow base body 21, and a lens set 23 movable with respect to the optical axis of the through-opening 211 disposed inside the lens barrel 22; therefore, many configurations can be used in the present invention.

It will be apparent to those skilled in the art that various modifications and variations can be made in the present invention according to the above embodiment.

Referring to FIG. 5 and FIG. 6, the present invention provides a piezoelectric-driving optical lens module including a lens body 2, a piezoelectric actuator 3 for providing a driving force, and a position sensor 4 for detecting position variations.

The lens body 2 includes at least a hollow base body 21 with a through-opening 211, a lens barrel 22 with axial freedom of movement along the optical axis of the through-opening 211 positioned inside the hollow base body 21, and a lens set 23 movable with respect to the optical axis of the through-opening 211 disposed inside the lens barrel 22. In this embodiment, the lens body 2 comprises two lens barrels 22 positioned inside the hollow base body 21 two corresponding lens sets 23 fixed at the two lens barrels 22. However, the number of hollow base bodies 21, lens barrels 22, and lens sets 23 is not fixed in regard to the design of practical structures, so a lens barrel 22 and a lens set 23 are chosen just for illustrating the present invention.

A through-opening 211 is located at the front side of the hollow base body 21, and an optical lens (or multi-lenses) 212 is used to cover the through-opening 211. A lens barrel 22 with axial freedoms along the optical axis of the through-opening 211 is positioned inside the hollow base body 21, and a lens set 23 with respect to the optical axis of the through-opening 211 is disposed inside the lens barrel 22. In this embodiment, the lens body 2 further comprises a cover body 24. The hollow base body 21 has an opening 213 located in the opposite side of the through-opening 211 for installing the lens barrel 22, the lens set 23, and the piezoelectric actuator 3. And by closing the cover body 24, the lens barrel 22, the lens set 23, and the piezoelectric actuator 3 are positioned. Besides, the lens body 2 further comprises a first guiding part 25 parallel to the optical axis of the through-opening 211 and positioned inside the hollow base body 21. A second guiding part 221 corresponding to the first guiding part 25 is positioned in the outer side of the lens barrel 22 as to move the lens barrel 22 inside the hollow base body 21 along the optical axis of the through-opening 211. The first guiding part 25 includes guiding tracks along two inner sides of the hollow base body 21, and the second guiding part 221 includes guiding troughs corresponding to the first guiding part 25 along two sides of the lens barrel 22. The inserting holes 214 and 241 are separately corresponding to the two sides of the hollow base body 21 and the cover body 24. The first guiding parts 25 are inserted into the inserting holes 214 and 241 for connecting the cover body 24 with the hollow base body 21.

The piezoelectric actuator 3 is positioned between the hollow base body 21 and the lens barrel 22. The lens barrel 22 is driven by a piezoelectric actuator 3 to move the lens set 23 along the optical axis to achieve the optical functions as zooming and focusing. In this embodiment, the lens body 2 further includes a wear-resisting part 26 located at the inner surface of the hollow base body 21. The piezoelectric actuator 3 is fixed at the outer side of the lens barrel 22 and contacted with the wear-resisting part 26. The piezoelectric actuator 3 includes a stator 31 and a pre-stress device 32 both fixed and contacted with each other at the outer side of the lens barrel 22. Besides, a C-shaped trough 222 is located at the outer side of the lens barrel 22 for tightening the stator 31 for providing best connecting boundary condition.

Besides, in this embodiment, the pre-stress device 32 includes an elastic component positioned between the stator 31 and the outer side of the lens barrel 22, wherein the elastic component is, for example, a rubber pad or a leaf spring to provide the pre-stress for the stator 31 contacted with the wear-resisting part 26. The said wear-resisting part 26 can be sliding track. Preferably, the material for the sliding track can be chosen from metal, oxide, and wear-resisting material.

The stator 31 includes a metal tube 311 and two piezoelectric ceramic pieces 312. The two piezoelectric ceramic pieces 312 are separately fixed at the outer surface of the metal tube with a distance. And, for example, the two piezoelectric ceramic pieces 312 are vertical to each other. The piezoelectric ceramic pieces 312 can be single-layer or multi-layers. Meanwhile, the piezoelectric ceramic pieces 312 can be polarized, electrode spreading, or cutting, according to the mold shape.

The metal tube 311 can be connected to the cathode of the outside power source, and the two piezoelectric ceramic pieces 312 can be connected to the anode of the outside power source. By applying the voltage, for example, the string waves driving voltage Vsin (wt) or Vcos (wt), to a piezoelectric ceramic piece 312, and using the reverse piezoelectric effect to make the stator 31 produce high frequency vacillating mechanical energy to form a circular motion in a hula hoop mode, the lens barrel 22 corresponding to the hollow base body 21 is driven by the controlled two-way rotation (clockwise and counter-clockwise) power to move along the axial direction for achieving the optical functions as zooming and focusing. Of course, the applied driving voltage can be, for example, square waves or saw waves, and not restricted to string waves.

On the other hand, however, the stator is not restricted to the stator 31 illustrated in this embodiment, for example, and composed of a metal tube 311 and two piezoelectric ceramic pieces 312. The stator forming a circular motion in a hula hoop mode is the stator 312 of the present invention. The stator 312 can be, for example, a piezoelectric tube including a tube-shaped piezoelectric ceramic body with the ZtTi material or electricity-enable elastic material, a first electrode and a second electrode and a third electrode separately located at the outer surface of the piezoelectric ceramic body. The first electrode is connected to the cathode of the outside power source, and the second electrode and the third electrode are separately connected to two anodes of the outside power source.

The lens body 2 comprises two lens barrels 22 positioned inside the hollow base body 21 and the corresponding two lens sets 23 fixed at the two lens barrels 23. The direction of the lens barrel 22 disposed with the piezoelectric actuator 3 can be alternatively upside down. That is, a piezoelectric actuator 3 is disposed to the top of a lens barrel 22, and, on the other hand, the other piezoelectric actuator 3 is disposed to the bottom of the other lens barrel 22, and the corresponding wear-resisting parts 26 are separately fixed at the upper and lower surface inside the hollow base body 21, to provide complementary allocation effect to reduce allocation space for her minimizing the whole volume of the piezoelectric-driving optical lens module of the present invention.

The position sensor 4 can be chosen from optical sensor devices or electromagnetic sensor devices. In this embodiment, the position sensor 4 includes a position reacting component 41 located at the outer side of the lens barrel 22, and a signal-receiving component 42 fixed at the hollow base body 21 for receiving signals. The said position reacting component 41 can be, for example, a reflecting bar-code, and the said signal receiving component 42 can be, for example, a sensor. The driving position of the two lens sets 23 demands high precision to maintain high definition of image quality for optical lens module. Therefore, by utilizing the position sensor 4 to provide the real-time position signal to ensure the feedback and to correct the driving control of the piezoelectric actuator 3, the lens barrel 22 can be ensured in the correct position to maintain high definition of image quality. Meanwhile, the position sensor 4 can also be in reverse allocation, and not restricted to as shown in this embodiment. For example, the position reacting component 41 can be fixed at the hollow base body 21, and the signal-receiving component 42 can be fixed at the outer side of the lens barrel 22. However, it will be apparent to those skilled in the art that various modifications and variations can be made in the present invention according to the above embodiment.

The Second Embodiment

Figure 7:
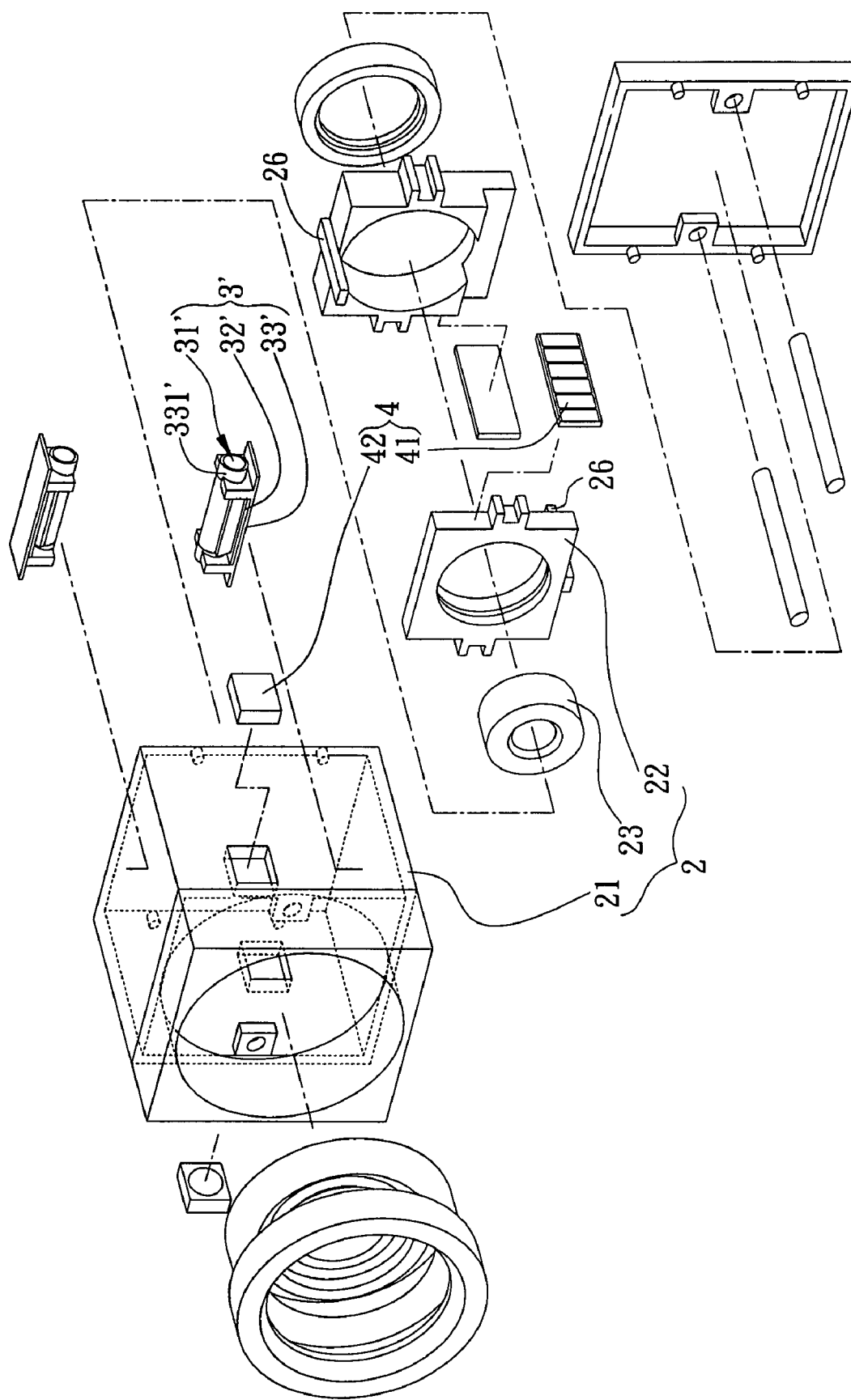
FIG. 7 is an exploded view showing the second embodiment according to the present invention.

Referring to FIG. 7, the difference between this embodiment and the first embodiment are the design and allocation of the piezoelectric actuator 3. And the design of the hollow base body 21, the lens barrel 22, the lens set 23, and the position sensor 4 is almost the same as in the first embodiment. Only parts allocation of structure design related to the piezoelectric actuator 3 is adjusted.

As shown in FIG. 7, the lens body 2 further includes a wear-resisting part 26 located at the outer side of the lens barrel 22. The piezoelectric actuator 3 is fixed at the inner surface of the hollow base body 21 and contacted with the wear-resisting part 26. That is, the wear-resisting part 26 is altered to be fixed at corresponding the outer side of the lens barrel 22, and the piezoelectric actuator 3 is changed to be fixed at the inner surface of the hollow base body 21. The said piezoelectric actuator 3 includes a stator 31 and a pre-stress device 32 both fixed and contacted with each other at the inner side of the hollow base body 21. And meanwhile, a C-shaped trough 331' is located at the inner side of the hollow base body 21 for tightening the stator 31'. In this embodiment, the pre-stress device 32' includes an elastic component positioned between the stator 31' and the inner surface of the hollow base body 21, wherein the elastic component is, for example, a rubber pad or leaf spring. In this embodiment, a C-shaped trough 331' is located at a base 33', the pre-stress device 32' and the stator 31 are installed at the C-shaped trough 331', and, finally, the base 33' is fixed at the corresponding site of the inner surface of the hollow base body 21. However, in other embodiments, the C-shaped trough 331' can be directly formed in the corresponding site of the inner surface of the hollow base body 21 without the base 33', and not be restricted to this embodiment.

The Third Embodiment

Figure 8:
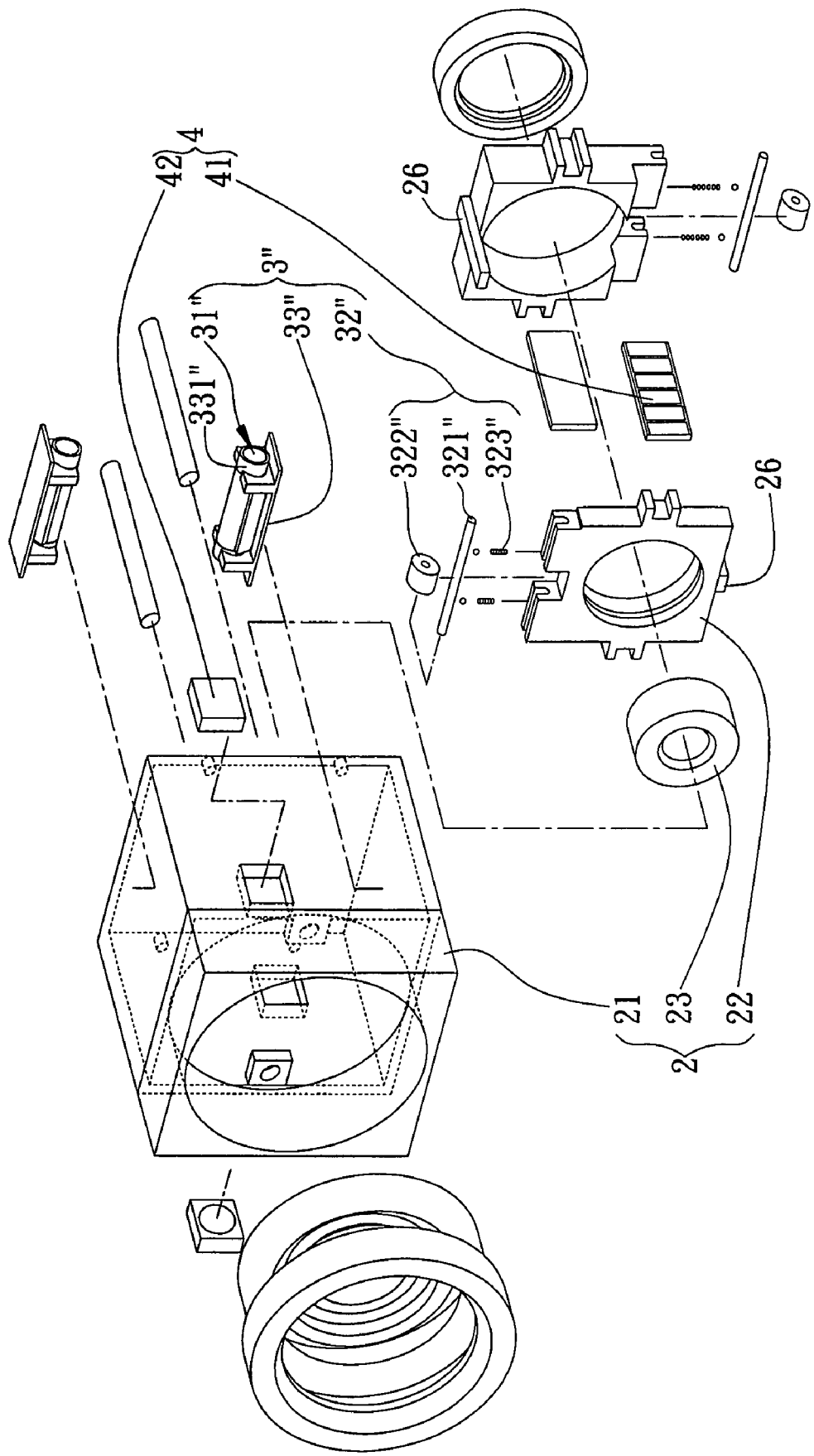
FIG. 8 is an exploded view showing the third embodiment according to the present invention.

Referring to FIG. 8, the difference between this embodiment and the second embodiment are the design and allocation of the piezoelectric actuator 3. And the design of the hollow base body 21, the lens barrel 22, the lens set 23, and the position sensor 4 is almost the same as in the second embodiment. Only parts allocation of structure design related to the piezoelectric actuator 3 is adjusted.

As shown in FIG. 8, the lens body 2 further includes a wear-resisting part 26 located at the outer side of the lens barrel 22. The piezoelectric actuator 3" includes a pre-stress device 32" corresponding far from the wear-resisting part fixed at the outer side of the lens barrel 22, and a stator 31" fixed at the inner surface of the hollow base body 21 and contacted with the wear-resisting part 26. Meanwhile, a C-shaped trough 331" is located at the inner surface of the hollow base body 21 for tightening the stator 31". In this embodiment, the pre-stress device 32" includes an adjusting member 321" corresponding far from the wear-resisting part 26 located at a side of the lens barrel 22, an roller 322" fixed at the adjusting member 321" to roll and to contact with the inner surface of the hollow base body 21, and an elastic member 323" to make the roller 322" contact with the pre-stress device 32", wherein the elastic member 323" can be, for example, a compressing spring or a torque spring. In this embodiment, a C-shaped trough 331' is pre-located at a base 33', the pre-stress device 32' and the stator 31 are installed at the C-shaped trough 331', and, finally, the base 33' is fixed at the corresponding site of the inner surface of the hollow base body 21. However, in other embodiments, the C-shaped trough 331' can be directly formed in the corresponding site of the inner surface of the hollow base body 21 without the base 33', and not be restricted to this embodiment.

The design structure disclosed in the third embodiment can also be applied to the first embodiment. The pre-stress devices in the first embodiment are replaced by the structural design in the third embodiment. That is, as for the structure in the first embodiment, the pre-stress device includes an adjusting member correspondingly far from the wear-resisting part located at a side of the lens barrel, a roller fixed at the adjusting member for rolling to contact with the inner surface of the hollow base body, and an elastic member to make the roller contact with the pre-stress device. It will be apparent to those skilled in the art that various modifications and variations can be made in the present invention according to the above embodiment.

According to the present invention, A piezoelectric-driving optical lens module is disclosed, including a lens body, a piezoelectric actuator for providing a driving force, and a position sensor for detecting position variations. The present invention can provide a piezoelectric-driving optical lens module with simplified structure, minimized volume, increased torque, solid structure, ease of manufacture, and ease of assembly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A piezoelectric-driving optical lens module comprising:
a lens body having at least a hollow base body with a through-opening, multiple lens barrels each with axial freedom of movement along an optical axis of the through-opening positioned inside the hollow base body, multiple lens sets corresponding to the lens barrels and each moving with respect to the axis of the through-opening disposed inside the corresponding lens barrel, a first guiding part parallel to the optical axis of the through-opening and positioned inside the hollow base body, and a second guiding part corresponding to the first guiding part positioned at the outside of one of the lens barrels so as to move the lens barrel inside the hollow base body along the optical axis of the through-opening, wherein the first guiding part includes guiding troughs along two insides of the hollow base body, and the second guiding part has guiding troughs corresponding to the first guiding part along two sides of the lens barrel;
a piezoelectric actuator positioned between the hollow base body and the lens barrels and driving the lens barrels to move the lens sets along the optical axis to achieve the optical functions as zooming and focusing; and
a position sensor positioned inside the hollow base body and configured to detect the axial position of the lens barrels with respect to the hollow base body.

2. The piezoelectric-driving optical lens module according to claim 1, wherein the lens body further includes a cover body and the hollow base body having an opening located in the opposite side of the through-opening for installing the lens barrel and the lens set, as well as the piezoelectric actuator, and for closing the cover body for positioning the lens barrel, the lens set, and the piezoelectric actuator.

3. The piezoelectric-driving optical lens module according to claim 1, wherein the lens body further includes a wear-resisting part located at an inner surface of the hollow base body, wherein the piezoelectric actuator fixed at the outer side of the lens barrel is in contact with the wear-resisting part.

4. The piezoelectric-driving optical lens module according to claim 3, wherein the piezoelectric actuator includes a stator and a pre-stress device both fixed and contacting with each other at an outer side of the lens barrel.

5. The piezoelectric-driving optical lens module according to claim 4, wherein the pre-stress device includes an elastic component positioned between the stator and the outer side of the lens barrel.

6. The piezoelectric-driving optical lens module according to claim 5, wherein the elastic component is a rubber pad.

7. The piezoelectric-driving optical lens module according to claim 4, wherein the pre-stress device includes an adjusting member correspondingly far from the wear-resisting part located at the side of the lens barrel, a roller fixed at the adjusting member to roll and contact with the inner surface of the hollow base body, and an elastic member to make the roller contact with the pre-stress device.

8. The piezoelectric-driving optical lens module according to claim 7, wherein the elastic member is a spring.

9. The piezoelectric-driving optical lens module according to claim 8, wherein the spring is chosen from a compressible spring and a torque spring.

10. The piezoelectric-driving optical lens module according to claim 4, wherein a C-shaped trough is located at the outer side of the lens barrel to hold the stator tightly.

11. The piezoelectric-driving optical lens module according to claim 1, wherein the lens body further includes a wear-resisting part located at the outer side of the lens barrel, and the piezoelectric actuator is fixed at the inner surface of the hollow base body and in contact with the wear-resisting part.

12. The piezoelectric-driving optical lens module according to claim 11, wherein the piezoelectric actuator includes a stator and a pre-stress device both fixed and in contact with each other at the inner side of the hollow base body.

13. The piezoelectric-driving optical lens module according to claim 12, wherein the pre-stress device includes an elastic component positioned between the stator and the inner surface of the hollow base body.

14. The piezoelectric-driving optical lens module according to claim 13, wherein the elastic component is a rubber pad.

15. The piezoelectric-driving optical lens module according to claim 13, wherein a C-shaped trough is located at the inner side of the hollow base body for keeping the stator tight.

16. The piezoelectric-driving optical lens module according to claim 1, wherein the lens body further includes a wear-resisting part located at the outer side of the lens barrel, and the piezoelectric actuator includes a pre-stress device correspondingly far from the wear-resisting part fixed at the outer side of the lens barrel, and a stator fixed at the inner surface of the hollow base body and in contact with the wear-resisting part.

17. The piezoelectric-driving optical lens module according to claim 16, wherein the pre-stress device includes an adjusting member correspondingly far from the wear-resisting part located at a side of the lens barrel, a roller fixed at the adjusting member to roll and contact with the inner surface of the hollow base body, and an elastic member to make the roller contact with the pre-stress device.

18. The piezoelectric-driving optical lens module according to claim 17, wherein the elastic member is spring.

19. The piezoelectric-driving optical lens module according to claim 18, wherein the elastic member is chosen from a compressible spring and a torque spring.

20. The piezoelectric-driving optical lens module according to claim 16, wherein a C-shaped trough is located at the inner side of the hollow base body for keeping the stator tight.

21. The piezoelectric-driving optical lens module according to claim 3, claim 11, or claim 16, wherein the wear-resisting part is sliding track.

22. The piezoelectric-driving optical lens module according to claim 21, wherein the material for the sliding track is chosen from metal, oxide, and wear-resisting material.

23. The piezoelectric-driving optical lens module according to claim 4, claim 12, or claim 16, wherein the stator includes a metal tube and two piezoelectric ceramic pieces.

24. The piezoelectric-driving optical lens module according to claim 23, wherein the two piezoelectric ceramic pieces are separately with a distance fixed at the outer surface of the metal tube.

25. The piezoelectric-driving optical lens module according to claim 23, wherein the piezoelectric ceramic pieces are chosen from single-layer or multi-layers.

26. The piezoelectric-driving optical lens module according to claim 23, wherein, depending on the mold shape, the piezoelectric ceramic pieces are polarized, electrode spreading, or cutting.

27. The piezoelectric-driving optical lens module according to claim 1 wherein the lens set is chosen from an optical lens and multi-lenses.

28. The piezoelectric-driving optical lens module according to claim 1, wherein the position sensor can be chosen from optical sensor devices and electromagnetic sensor devices.

29. The piezoelectric-driving optical lens module according to claim 1, wherein the position sensor includes a position reacting component located at the outer side of the lens barrel, and a signal-receiving component fixed at the hollow base body for receiving signals.

30. The piezoelectric-driving optical lens module according to claim 29, wherein the position reacting component is a reflecting bar-code, and the signal-receiving component is a sensor.

31. The piezoelectric-driving optical lens module according to claim 1, wherein the position sensor includes a position reacting component fixed at the hollow base body, and a signal-receiving component located at the outer side of the lens barrel for receiving signals.

* * * * *